(12) United States Patent
Kim et al.

(10) Patent No.: US 11,366,766 B2
(45) Date of Patent: Jun. 21, 2022

(54) ELECTRONIC DEVICE AND CONTROL METHOD THEREOF

(71) Applicant: Samsung Electronics Co., Ltd., Suwon-si (KR)

(72) Inventors: Dong-uk Kim, Yongin-si (KR); Jin-bum Park, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 149 days.

(21) Appl. No.: 16/637,487

(22) PCT Filed: Sep. 12, 2018

(86) PCT No.: PCT/KR2018/010657
§ 371 (c)(1),
(2) Date: Feb. 7, 2020

(87) PCT Pub. No.: WO2019/066317
PCT Pub. Date: Apr. 4, 2019

(65) Prior Publication Data
US 2020/0250106 A1 Aug. 6, 2020

(30) Foreign Application Priority Data
Sep. 28, 2017 (KR) .................. 10-2017-0125929

(51) Int. Cl.
*G06F 12/00* (2006.01)
*G06F 12/14* (2006.01)
(Continued)

(52) U.S. Cl.
CPC ........ *G06F 12/145* (2013.01); *G06F 9/45558* (2013.01); *G06F 12/04* (2013.01);
(Continued)

(58) Field of Classification Search
CPC .... G06F 12/145; G06F 9/45558; G06F 12/04; G06F 12/0871; G06F 21/57;
(Continued)

(56) References Cited

U.S. PATENT DOCUMENTS 8,341,758 B2  12/2012  Kim et al.
9,436,603 B1  9/2016  Pohlack
(Continued)

FOREIGN PATENT DOCUMENTS

JP  2012-023618 A  2/2012
JP  5840160 B2  1/2016
(Continued)

OTHER PUBLICATIONS

Ning Zhang et al., "TruSpy: Cache Side-Channel Information Leakage from the Secure World on ARM Devices", Virginia Polytechnic Institute and State University et al.
(Continued)

*Primary Examiner* — Arvind Talukdar
(74) *Attorney, Agent, or Firm* — Jefferson IP Law, LLP

(57) ABSTRACT

Disclosed are an electronic device and a control method thereof. The electronic device according to the present disclosure includes a memory, a cache memory, a CPU, and includes a processor which controls the electronic device by using a program stored in the memory, wherein the CPU monitors an input address through which an input value is accessed in the cache memory, and changes the input address when the input address through which the input value is accessed in the cache memory is changed to a preset pattern.

13 Claims, 12 Drawing Sheets

(51) Int. Cl.
    G06F 9/455      (2018.01)
    G06F 12/04     (2006.01)
    G06F 12/0871   (2016.01)
    G06F 21/57     (2013.01)
(52) U.S. Cl.
    CPC .......... *G06F 12/0871* (2013.01); *G06F 21/57* (2013.01); *G06F 2009/45587* (2013.01); *G06F 2212/1021* (2013.01)
(58) Field of Classification Search
    CPC ... G06F 2009/45587; G06F 2212/1021; G06F 3/06; G06F 11/1446; G06F 13/16; G06F 12/00
    See application file for complete search history.

(56) References Cited

U.S. PATENT DOCUMENTS

| | | | |
|---|---|---|---|
| 9,438,624 B2 | 9/2016 | Fine | |
| 10,706,147 B1* | 7/2020 | Pohlack | .............. G06F 12/0811 |
| 2007/0150530 A1 | 6/2007 | Mevergnies et al. | |
| 2011/0293097 A1* | 12/2011 | Maino | ................. G06F 12/0811 380/279 |
| 2015/0249535 A1 | 9/2015 | Mukhopadhyay et al. | |
| 2017/0201503 A1* | 7/2017 | Jayasena | ................. G06F 21/79 |

FOREIGN PATENT DOCUMENTS

| | | |
|---|---|---|
| KR | 10-1418962 B1 | 7/2014 |
| KR | 10-2014-0118070 A | 10/2014 |
| KR | 10-2017-0003494 A | 1/2017 |

OTHER PUBLICATIONS

Wang et al., New Cache Designs for Thwarting Software Cache-based Side Channel Attacks, ISCA'07, Jun. 9-13, 2007, San Diego, California, USA.

Korean Office Action dated Sep. 27, 2021, issued in Korean Patent Application No. 10-2017-0125929.

* cited by examiner

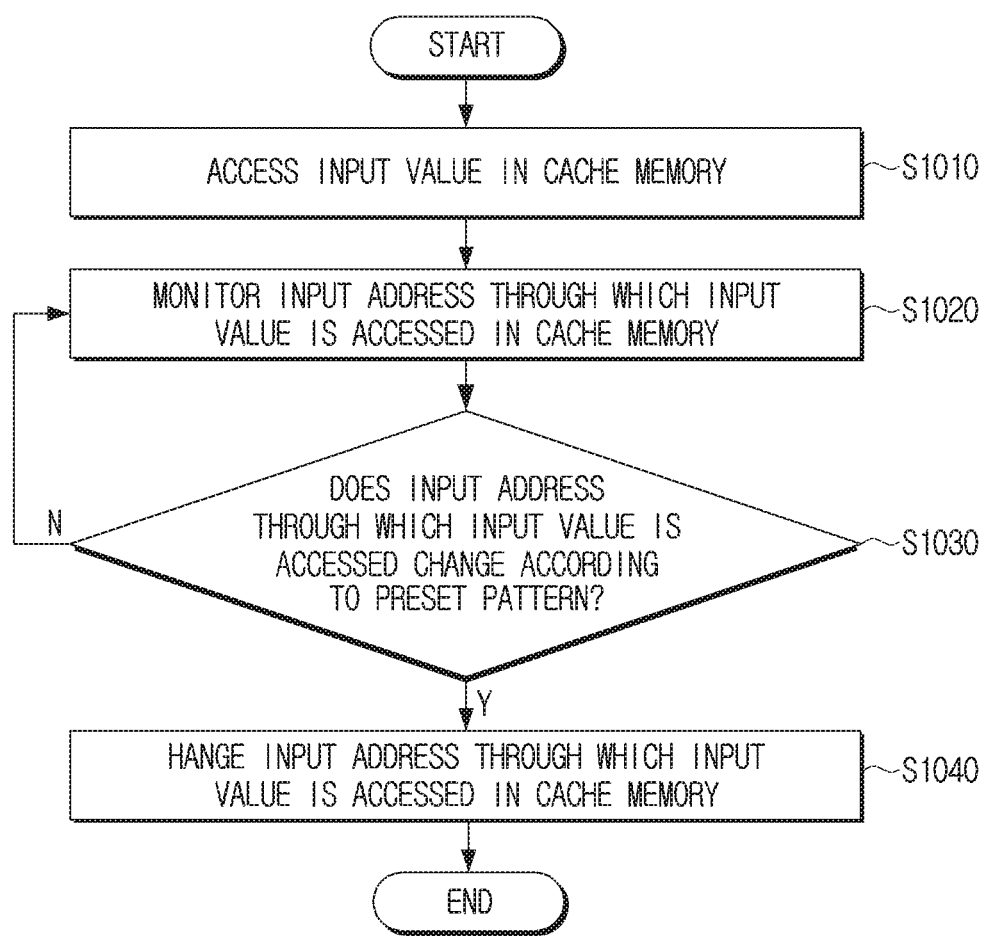

ELECTRONIC DEVICE AND CONTROL METHOD THEREOF

TECHNICAL FIELD

The present disclosure relates to an electronic device and a control method thereof, and more specifically to an electronic device for preventing a cache timing attack and a control method thereof.

BACKGROUND ART

Various types of electronic devices are being developed and distributed with the development of electronic technology. In addition thereto, due to the development of communication technology, the various electronic devices are providing various services to users connected via wired networks or wireless networks. With the development of various electronic devices, various methods for improving the security of the electronic devices have been presented. For example, recently, electronic devices are being protected using codes generated through various encryption methods, and other various information are being protected.

However, with the development of encryption technology, technology for decrypting codes are also being developed. Recently, methods for finding out cryptographic keys or passwords using physical attack methods such as side channel attacks have been presented.

The side channel attacks include a cache timing attack, a power analysis attack, an electromagnetic analysis attack (EM Attack), or the like. Specifically, the above described methods may analyze the code by analyzing output time of an output value for the various calculations, power consumed for the various calculations, or magnetic waves generated for the various calculations.

The side channel attack may be used together with a brute force attack method. The brute force attack refers to an attack method that substitutes all possible values for decrypting a specific code.

In order to prevent a side channel attack and a brute force attack such as what has been described above, various methods have been discussed conventionally changing the physical features of hardware by modifying the encryption algorithm itself.

DISCLOSURE

Technical Problem

The disclosure has been devised to solve the above described problem, and aims to prevent an attack by detecting the attack intent of the attacker without modifying the encryption algorithm.

Technical Solution

According to an embodiment of the present disclosure to solve the problem above, an electronic device includes a memory, a cache memory, a central processing unit (CPU), and includes a processor which controls the electronic device by using a program stored in the memory, wherein the CPU monitors an input address through which an input value is accessed in the cache memory, and changes the input address when the input address through which the input value is accessed in the cache memory is changed to a preset pattern.

The CPU may, based on an input value being accessed a predetermined number of times in the cache memory through an input address, monitor the input address through which the input value is accessed in the cache memory.

The CPU may determine whether an input value accessed by a specific input address in the cache memory is a cache hit or a cache miss, and based on the cache hit being occurred after the cache miss is occurred for a predetermined number of times or more, monitor an input address through which an input value is accessed in the cache memory.

The preset pattern may include an input address through which an input value is accessed in the cache memory being a pattern that increases or decreases by a preset address.

The CPU may selectively operate with one of a normal world operating in a normal operating system (OS) and a secure world operating in a secure OS, and monitor an input address through which an input value is accessed in the cache memory while operating in the normal world.

The CPU may operate in a hypervisor mode that controls a plurality of virtual operating systems, and monitor an input address through which an input value is accessed in the cache memory in the hypervisor mode.

The cache memory may include a plurality of cache sets comprising a plurality of words, and the CPU may, based on an input address through which an input value is accessed being changed to a preset pattern in one word from the plurality of words, change the input address through which the input value is accessed to an input address of a first word of a cache set comprising the word.

According to another embodiment of the present disclosure to solve the above described problem, a control method of an electronic device includes, based on an input value being accessed in the cache memory, monitoring an input address through which the input value is accessed, and based on an input address through which the input value is accessed being changed to a preset pattern, changing the input address.

The monitoring may include, based on an input value being accessed a predetermined number of times in the cache memory through an input address, monitoring the input address through which the input value is accessed.

The monitoring may further include determining whether an input value accessed by a specific input address in the cache memory is a cache hit or a cache miss, and based on the cache hit being occurred after the cache miss is occurred a predetermined number or times or more, monitoring an input address through which an input value is accessed in the cache memory.

The preset pattern may include an input address through which an input value is accessed in the cache memory being a pattern that increases or decreases by a preset address.

The monitoring may further include selectively operating with one of a normal world operating in a normal operating system (OS) and a secure world operating in a secure OS, and monitoring an input address through which an input value is accessed in the cache memory while operating in the normal world.

The monitoring may further include operating in a hypervisor mode that controls a plurality of virtual operating systems, and monitoring an input address through which an input value is accessed in the cache memory in the hypervisor mode.

The cache memory may include a plurality of cache sets including a plurality of words, and the changing may, based on an input address through which an input value is accessed being changed to a preset pattern in one word from the plurality of words, changing the input address through which the input value is accessed to an input address of a first word of a cache set including the word.

According to still another embodiment to solve the above described problem, a computer readable recording medium including a program for controlling an electronic device, the control method of the electronic device includes, based on an input value being accessed in the cache memory, monitoring an input address through which the input value is being accessed, and based on the input address through which the input value is accessed being changed to a preset pattern, changing the input address.

Effect of Invention

According to the various embodiments of the disclosure as described above, the electronic device may prevent a cache timing attack by an attacker by detecting the attack by the attacker without modifying an encryption algorithm.

DESCRIPTION OF DRAWINGS

FIG. 10 is a flowchart for describing an operation of an electronic device according to an embodiment of the disclosure.

DETAILED DESCRIPTION OF EXEMPLARY EMBODIMENTS

Figure 1A:
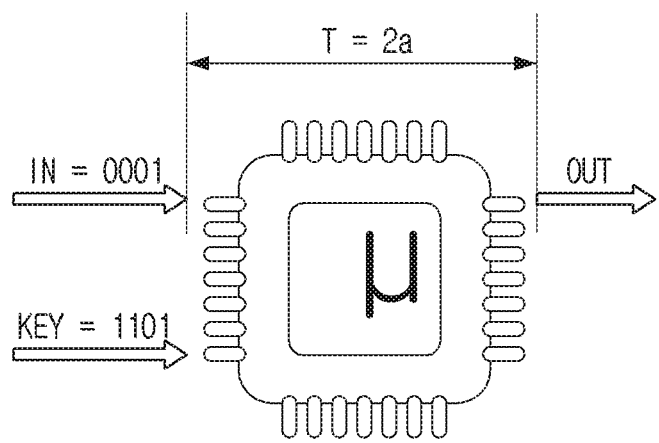
FIGS. 1A and 1B are exemplary views for describing a method for finding cryptographic keys through conventional timing attacks.

In describing the disclosure, terms used herein will be briefly described, and the disclosure will be described in greater detail.

The terms used in the embodiments are widely used general terms that have been selected considering the functions herein, but may vary depending on the intention of those skilled in the related art or a judicial precedent, the emergence of a new technologies, and the like. In a specific case, terms arbitrarily selected by an applicant may exist, and in this case, the meaning of the term will be disclosed in detail in a corresponding part of the detailed description. Accordingly, the terms used herein should be defined based on the meaning of the terms and the overall contents throughout the disclosure rather than simple names of the terms.

Various modifications may be made to the various embodiments, and various types of embodiments may result therefrom. Accordingly, specific embodiments may be illustrated in drawings, and described in greater detail in the detailed description. However, it should be noted that the various embodiments are not for limiting the scope of the disclosure to a specific embodiment, and should be interpreted to include all modifications, equivalents or alternatives of the embodiments included in the idea and the technical scope disclosed herein. In describing the embodiments, based on determining that the detailed description of the related known technologies may confuse the gist of the disclosure, the detailed description thereof may be omitted.

The terms such as first, second, and the like may be used to describe a variety of elements, but the elements should not be limited by these terms. The terms may be used only for the purpose of distinguishing one element from another element.

A singular expression may include a plurality of expressions unless otherwise clearly specified in context. It should be understood that terms such as "comprise" or "consist of" used herein are to designate a presence of a characteristic, number, step, operation, element, component, or a combination thereof, and not to preclude a presence or a possibility of adding one or more of other characteristics, numbers, steps, operations, elements, components or a combination thereof.

The terms 'module' or 'part' used in the embodiments herein perform at least one function or operation, and may be implemented as a hardware or software, or a combination of hardware and software. Further, a plurality of 'modules' or a plurality of 'parts', except for a 'module' or a 'part' which needs to be implemented to a specific hardware, may be integrated to at least one module and implemented in at least one processor (not shown).

In the embodiments, when a certain part is referred to as being "connected to" another part, it is not only the case where a part is "directly connected", but also is the case where a part is "electrically connected" by interposing another element therebetween. Further, when a certain part is referred to as "including" a certain element, unless otherwise specified, this may mean that other elements may be further included rather than excluding the other elements.

The detailed description has been described in greater detail below with reference to the accompanying drawings to enable those of ordinary skill in the technical field to which the disclosure pertains to easily practice the disclosure. However, the disclosure may be implemented to various different forms and is not limited to the embodiments described herein. In order to clearly describe the disclosure, parts unrelated to the description have been omitted, and like reference numerals have been affixed to like parts throughout the specification.

In addition, according to an embodiment, an "application" refers to a set of computer programs designed to perform a specific task. In the embodiments, the application may vary. For example, the application may include game applications, video playback applications, map applications, memo applications, calendar applications, phone book applications, broadcast applications, workout support applications, payment applications, image folder applications, medical appliance controlling applications, applications for providing user interface in multiple medical appliances, and the like, but is not limited thereto.

The electronic device 300 according to an embodiment may be implemented as a smartphone, but this is merely one embodiment, and include at least one of a tablet personal computer (PC), mobile phone, a video telephone, an e-book reader, a desktop PC, a laptop PC, a netbook computer, a workstation, a server, a personal digital assistant (PDA), a portable multimedia player (PMP), an MP3 player, a mobile medical device, a camera, or a wearable device. According to the various embodiments, the wearable device may include at least one of an accessory type (example: a watch, a ring, a bracelet, an anklet, a necklace, a pair of glasses, a pair of content lenses, or a head-mounted-device (HMD); a fabric or a garment-embedded type (example: electronic clothing); a body attachable type (example: a skin pad or a tattoo), or a bio-implantable type (example: implantable circuit).

According to another embodiment, the electronic device 300 may be a home appliance. The home appliance may include at least one of, for example, a television, a digital video disk (DVD) player, an audio, a refrigerator, an air conditioner, a vacuum cleaner, an oven, a microwave oven, a washing machine, an air purifier, a set-top box, a home automation control panel, a security control panel, a TV box (example: Samsung HomeSync™, Apple TV™, or Google TV™), game consoles (example: Xbox™, PlayStation™), an electronic dictionary, an electronic key, a camcorder, or an electronic frame.

According to still another embodiment, the electronic device 300 may include at least one of a variety of medical devices (example: various portable medical measurement devices (a blood glucose meter, a heart rate meter, a blood pressure meter, a temperature measuring device, etc.), a magnetic resonance angiography (MRA), a magnetic resonance imaging (MRI), a computed tomography (CT), a photographing device, an ultrasonic wave device, etc.), navigation devices global navigation satellite system (GNSS), event data recorder (EDR), flight data recorder (FDR), vehicle infotainment device, marine electronic equipment (example: a marine navigation device, a gyro compass, etc.), avionics, security devices, vehicle head units, industrial or domestic robots, drone, automated teller machine (ATM)s of financial institutions, points of sale of stores, or Internet of Things (IoT) devices (example: light bulbs, various sensors, electric or gas meters, sprinkler devices, fire alarms, thermostats, street lights, toasters, exercise equipment, hot water tanks, heater, boiler, etc.).

According to still another embodiment, the electronic device 300 may include at least one of a furniture or a part of building/structure, an electronic board, an electronic signature receiving device, a projector, or various measurement equipment (example: water, electricity, gas, or radio wave measuring equipment, etc.).

Figure 1B:
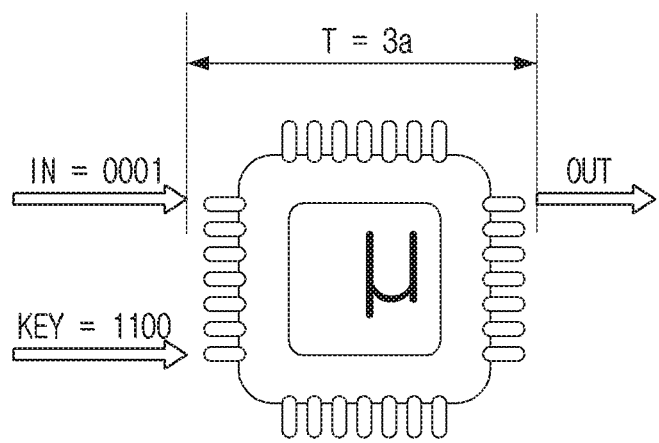

FIGS. 1A and 1B are exemplary views for describing a method for finding cryptographic keys through conventional timing attacks.

As illustrated in FIG. 1A, based on an input value 0001 and a key 1101 being input to a processor (for example, a microprocessor) for executing a specific cryptographic algorithm, an output value may be output after a time of 2a has passed. As illustrated in FIG. 1B, based on an input value 0001 and a key 1101 being input to a microprocessor for executing the same cryptographic algorithm as in FIG. 1A, an output value may be output after a time of 3a has passed. Based on a key to be input being a correct key, the time for outputting the output value may be 2a, and based on the key to be input being an incorrect key, the time for outputting the output value may be 3a. In this case, an attacker trying to hack the cryptographic algorithm may identify that an encryption algorithm key being executed in FIGS. 1A and 1B is 1101. That is, the attacker may randomly input a plurality of key values without understanding the structure of the cryptographic algorithm, and understand the cryptographic algorithm key using the output time on the input key value.

Figure 2:
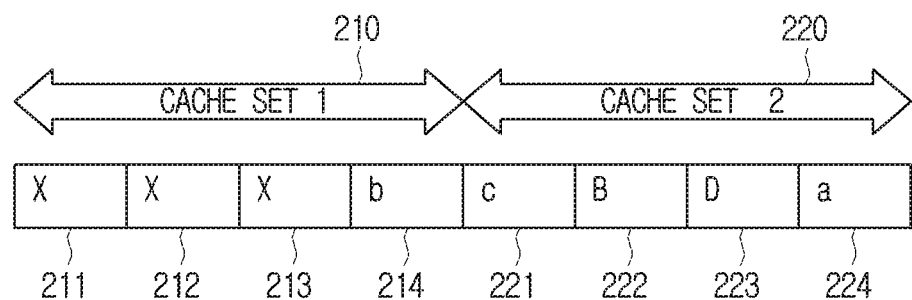
FIG. 2 is an exemplary view for describing a cache timing attack on a cache memory according to an embodiment of the disclosure.

FIG. 2 is an exemplary view for describing a cache timing attack on a cache memory according to an embodiment of the disclosure.

As illustrated in FIG. 2, a cache memory may consist of a first cache set 210 and a second cache set 220. Further, the first cache set 210 may consists of a first word to a fourth word 211 to 214, and the second cache set 220 may consist of a fifth word to an eighth word 221-224.

The CPU may read an encryption algorithm in a cache set unit, and output a result. That is, based on the size of the encryption algorithm program being large, since the encryption algorithm program executing a program by reading all data in the loaded memory is inefficient, the cache memory may read the encryption algorithm in the cache set unit and output the result. Accordingly, the CPU may, based on the result on the data loaded to the first cache set 210 being correct, read the data loaded to the second cache set 220. However, based on the result on the data loaded to the first cache set 210 being incorrect, it may not be necessary to read the data loaded to the second cache set 220. The attacker may use the feature to execute a timing attack. The specific attack method and the method of preventing the attack will be described in greater detail below.

Figure 3:
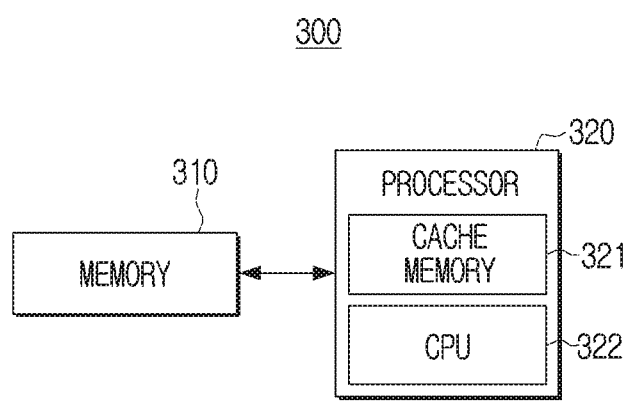
FIG. 3 is a block diagram for briefly illustrating a configuration of an electronic device for preventing a cache timing attack according to an embodiment of the disclosure.

FIG. 3 is a block diagram for briefly illustrating a configuration of an electronic device for preventing a cache timing attack according to an embodiment of the disclosure. Specifically, the electronic device 300 may include a memory 310 and a processor 320.

The memory 310 may store various programs and data necessary in the operation of the electronic device 300. The memory 310 may be implemented as a non-volatile memory, a volatile memory, a flash-memory, a hard disk drive (HDD), a solid state drive (SSD), or the like.

The memory 310 may be accessed by the processor 320, and fetching/recording/correcting/deleting/renewing of data or the like may be performed by the processor 320. The term 'memory' in the disclosure may include an attachable memory card (not shown) to the memory 310 and the electronic device 300 (for example, a micro SD card, a memory stick).

The processor 320 may include a cache memory 321 and a CPU 322. The cache memory 321 refers to a high-speed memory device or a buffer memory used for improving the processing speed of the processor 320. The cache memory 321 may include a variety of types such as a CPU cache, a buffer cache, a disk cache, and the like, but in the disclosure, the cache memory 321 being a CPU cache is described as an example. The cache memory 321 may be positioned near the CPU 322, but is not limited thereto, and may be included within the CPU 322.

As described above, the cache memory 321 may include a plurality of cache sets. The cache set may be a unit consisting of a plurality of words. A cache set may include four words, but is not limited thereto. In addition, a size of one word may be 16 bytes, but the size may be varied by 8 bytes, 12 bytes, 14 bytes, 32 bytes, or like.

The CPU 322 may control the overall operation of the electronic device 300. Specifically, the CPU 322 may read the data loaded to the cache memory 321, and execute a function related to the loaded data.

For example, the CPU 322 may perform various functions for controlling the electronic device 300 by executing the program stored in the memory 310.

In addition, the CPU 322 may monitor an input address through which an input value is accessed in a cache memory 321. Specifically, based on the CPU 322 being able to access a specific address of the cache memory 321, the CPU 322 may monitor the input address being accessed.

Based on the input address to be accessed changing to a preset pattern, the CPU 322 may change the input address to be accessed to an arbitrary different address. That is, based on the input address to be accessed being changed to a preset pattern, the CPU 322 may recognize the corresponding access as being made by the attacker, and may arbitrarily change the input address to be accessed.

For example, based on the CPU 322 detecting a preset pattern, the input address through which the input value is accessed may be changed to an initial starting address of the cache memory 321. However, the disclosure is not limited to this embodiment, and the CPU 322 may change the input address through which the input value is accessed to an arbitrary address of the cache memory 321. In addition, the CPU 322 may change the word corresponding to the input address through which the input value is accessed to an initial starting word address of the cache set including the word corresponding to the input address.

The preset pattern may be a pattern that the input address through which the input value is accessed in the cache memory 321 is increased or decreased. For example, based on the input address to be monitored decreasing in the order of 240, 214, 198, and 182 (when 1 word consists of 16 bytes) or increasing, the CPU 322 may change the input address through which the input value is input.

The CPU may, based on the input value being accessed a predetermined number of times in the cache memory 321 through the input address, the CPU may begin monitoring the input address through which the input value is accessed in the cache memory 321. That is, based on an attacker generally accessing the cache 321 through a brute force attack method, a plurality of input values in the cache memory 321 may be accessed through the same input address. Accordingly, based on different input values being accessed a predetermined number of times or more in the cache memory 321 through the same input address, the CPU 322 may determine the corresponding access as access by an attacker and begin monitoring. The determined number of times may be set differently according to the type and length of a code and cryptographic keys.

The CPU 322 may determine whether the input value accessed by a specific input address of the cache memory 321 is a cache hit or a cache miss. Based on a cache hit being occurred after a cache miss is occurred a predetermined number of times or more, the CPU 322 may determine the corresponding access as an access by an attacker and begin monitoring.

The electronic device 300 may selectively operate with one of a normal world operating in a normal OS and a secure world operating in a secure OS. The CPU 322 may monitor the input address through which the input value is accessed in the cache memory 321 while operating in a normal world.

According to another embodiment, the electronic device 300 may operate in a hypervisor mode capable of controlling a plurality of virtual operating systems. The CPU 322 may monitor the input address through which the input value is accessed in the cache memory 321 in a hypervisor mode.

Figure 4:
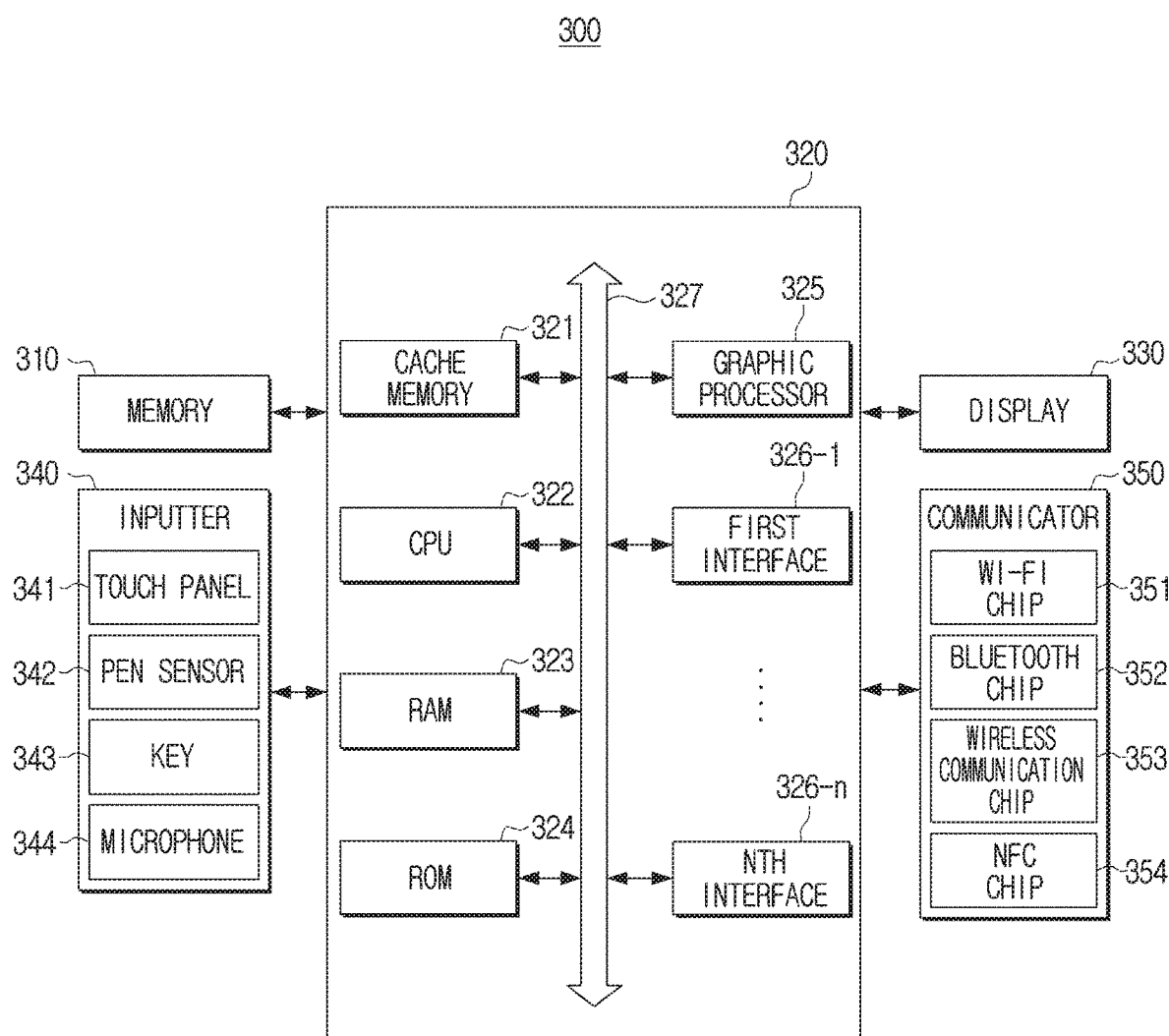
FIG. 4 is a block diagram for illustrating in detail a configuration of an electronic device 300 according to an embodiment of the disclosure.

FIG. 4 is a block diagram for illustrating in detail a configuration of an electronic device 300 according to an embodiment of the disclosure. As illustrated in FIG. 4, the electronic device 300 may further include a display 330, an inputter 340, and a communicator 350 in addition to a memory 310 and a processor 320. Although the disclosure is not limited thereto, some elements may be added or omitted according to necessity.

The memory 310 as described above may store various programs and data necessary in the operation of the electronic device 300.

The display 330 may display various screens in the display area. For example, the display 330 may display content such as application execution screens, images, video images, and texts.

The display 330 may be implemented as a display panel of various forms. For example, the display panel may be implemented through various display technology such as a liquid crystal display (LCD), an organic light emitting diodes (OLED), an active-matrix organic light-emitting diode (AM-OLED), a liquid crystal on silicon (LcoS) or a digital light processing (DLP).

In addition, the display 330 may be coupled to at least one of the front surface area, a side surface area, and a back surface area of the electronic device 300 in a flexible display form.

The inputter 340 may include a touch panel 341, a pen sensor 342, a key 343, and a microphone 344 to receive various input. The touch panel 341 may be configured by combining the display 330 with a touch sensor (not shown), and the touch sensor may use at least one method of a capacitive-type, a resistive-type, an infrared method, or an ultrasonic method. The touch panel may include not only the display function but also the function of detecting the location of the touch input, the touched area, and the pressure of the touch input. In addition, the touch panel may not only include real-touch but also the function of detecting proximity touch as well. The pen sensor 342 may be implemented as a part of the touch panel 341 or may include a separate sheet for recognition. The key 343 may include a physical button, an optical key, or a keypad. The microphone 344 may include at least one of a built-in microphone or an external microphone.

Specifically, the inputter 340 may receive an external instruction from the various above-described configurations and transmit to the processor 320. The processor 320 may generate a control signal corresponding to the received input and control the electronic device 300.

The communicator 350 may perform communication with an external device. Specifically, the communicator 350 may include various communication chips such as a Wi-Fi chip 351, a Bluetooth chip 352, a wireless communication chip 353, and a near-field communication (NFC) chip 354. The Wi-Fi chip 351, the Bluetooth chip 352, and the NFC Chip 354 may perform communication through a LAN method, a Wi-Fi method, a Bluetooth method, and an NFC method. Based on using the Wi-Fi chip 351 or the Bluetooth chip 352, various connection information such as a service set identifier (SSID) and a session key may be first transmitted and received and after establishing communication connection using the same and may transmit and receive various information. The wireless communication chip 353 may refer to a chip performing communication according to the various communication standards such as IEEE, Zigbee, 3rd generation (3G), 3rd generation partnership project (3GPP), and long term evolution (LTE).

The processor 320 may use the various programs stored in the memory 310 to control the overall operations of the electronic device 300.

The processor 320 may consist of a random access memory (RAM) 323, a read only memory (ROM) 324, a graphic processor 325, a first to nth interface 326-1 to 326-*n*, and a bus 327 in addition to the cache memory 321 and the CPU 322. The cache memory 321, the CPU 322, the RAM 323, the ROM 324, the graphic processor 325, the first to nth interface 326-1 to 326-*n*, and the like may be interconnected through the bus 327.

Figure 5:
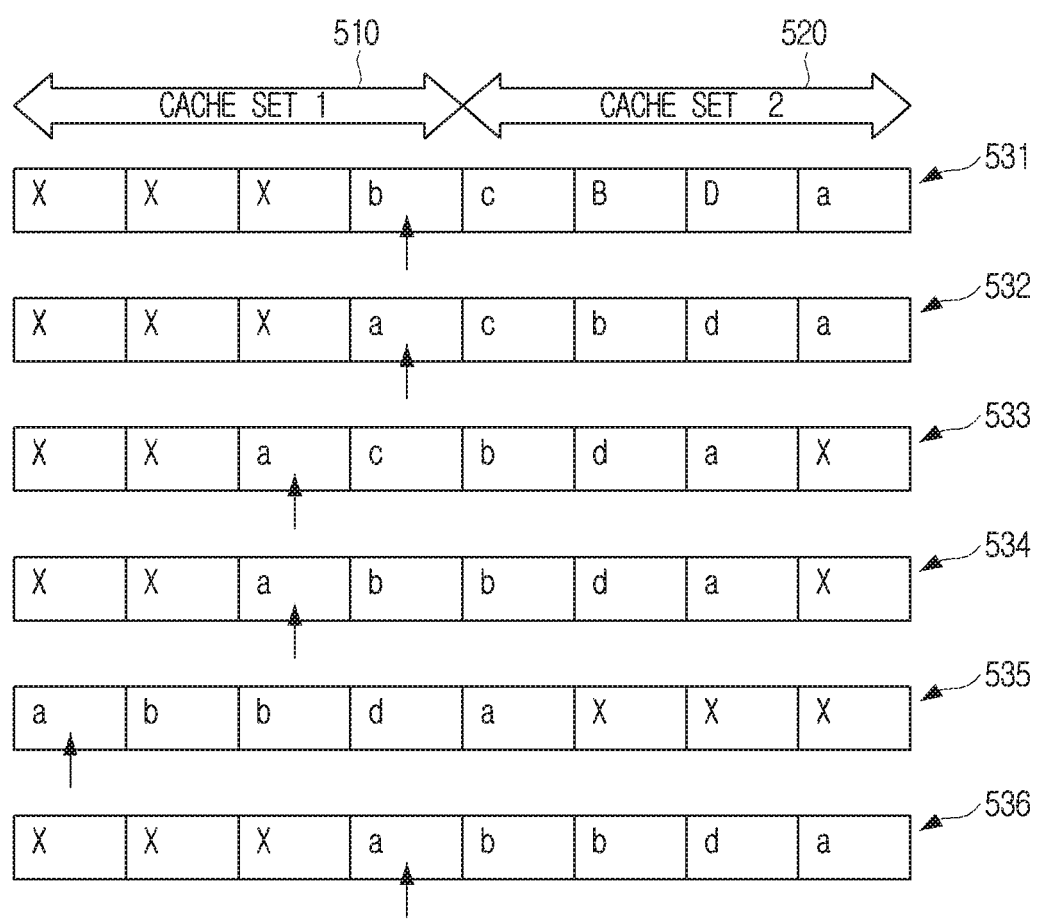
FIG. 5 is an exemplary view for describing a method for preventing a cache timing attack according to an embodiment of the disclosure.

FIG. 5 is an exemplary view for describing a method for preventing a cache timing attack according to an embodiment of the disclosure.

Specifically, the first cache memory to the fourth cache memory 531 to 534 in FIG. 5 is to describe a method in which an attacker may access the cache memory, and attempt to learn the code based on the code being abcde.

Specifically, in the case of the first cache memory 531, the attacker may input the value of "bcbda" sequentially from the fourth word in order to learn the code abcde. Based on 'b' which is input at the fourth word being different from 'a' which is the first letter of the code, the CPU may not load the second cache set 520.

After several attempts, the attacker may input the value "a" at the fourth word as in the second cache memory 532. Based on 'a' being the same as 'a' which is the first letter of the code, the CPU may load the second cache set 520. The attacker may, based on the second cache set 520 being loaded, analyze the time difference between the case of the first cache set 510 and the second cache set 520 being loaded and the case of only the first cache set 510 being loaded and learn that the first letter of the code is a.

Based on learning the first letter of the code with the method above, the attacker may modify the input address of the code by a constant rate. That is, as illustrated in the third cache memory 533, the attacker may input "acbda" sequentially from the first word. Based on 'c' input at the fourth word being different from the second code 'b', the CPU may not load the second cache set 520.

After another several attempts, the attacker may, as illustrated in the fourth cache memory 534, input "a" at the third word and "b" at the fourth word. Based on the input code being the same as the actual code, the CPU may load the second cache set 520. The attacker may, based on the second cache set 520 being loaded, may learn that the first letter of the code is a, and the second letter of the code is b. By repeating the method such as the above, the attacker may figure out the actual code.

However, based on the attacker obtaining the code through the above described method, the input address through which the input value is accessed in the cache memory 321 may be modified according to a set pattern.

For example, a first word to an eighth word being 16 bytes, and a starting address of the first word being 192 may be assumed. As described above, the attacker may, after inputting a cipher text from input address 240, determine whether the text is loaded to each cache set, and learn code a. Using the same method, the attacker may learn the cipher text by determining whether the cipher text is loaded to each cache set by changing the cipher text input address so that code b is applied to input address 224, code c to input address 208, code d to input address 192, and code e to input address 176.

That is, based on the attacker trying to learn the cipher text through the method described above, the input address for inputting the cipher text in order to learn the cipher text may change according to a set pattern (that is, in the aforementioned embodiment, the input address is decreased by 16 bytes). However, based on the size of the first word being 8 bytes, 12 bytes, 14 bytes, 32 bytes as described above, the input address may be changed by the size of each word.

Figure 6:
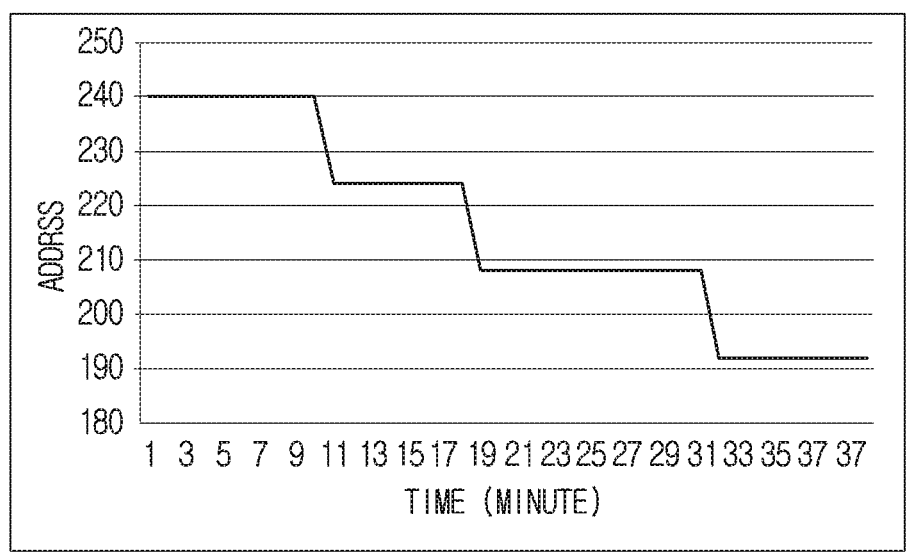
FIG. 6 is an exemplary view for describing a preset pattern according to an embodiment of the disclosure.

That is, based on the input address for inputting the cipher text changing according to a set pattern as illustrated in FIG. 6, the CPU 322 may determine that the cache memory 321 is being attacked, and may arbitrarily change the input address being input thereafter.

However, the CPU 322 may detect not only the pattern of the input address decreasing but also the pattern of the input address increasing, as well as change the input address through which the input value is accessed in the cache memory according to the detected pattern. That is, the preset pattern may be a pattern in case the input address is increased.

In addition, the preset pattern may be a pattern that not only decreases by one word (consisting of 16 bytes), but also a pattern that the input address increases or decreases by a predetermined number of words as shown in FIG. 6.

The preset pattern, in some cases, may be a pattern in which the increasing or decreasing word address is based on a specific progression (for example, an arithmetic progression, a geometric progression, or the like).

In addition, in FIG. 6, a preset pattern has been determined based on changes to the input address according to time, but in some cases, the preset pattern may also be determined based on changes to the input address according to the number of inputs.

Referring back to FIG. 5, based on the attacker attacking the cache memory 321 as in the first cache memory to the fourth cache memory 531 to 534 in FIG. 5 and the CPU 322 detecting the attack by the attacker, the CPU 322 may arbitrarily change the input address as illustrated in the fifth cache memory 535 and the sixth cache memory 536.

Specifically, based on the attacker obtaining codes a, b with the fourth cache memory 534, the attacker may input abXXX sequentially from the second word to find the third code (here, X may be an arbitrary letter). However, as illustrated in the fifth cache memory 353 or the sixth cache memory 536, based on the CPU 322 arbitrarily changing the access address of the input value to the first word 511 or the fourth word, the attacker is no longer able to analyze the time the output value is output according to input and find the code.

The fifth cache memory 535 is an embodiment in which the CPU 322 has changed the input address to the first word, which is the initial starting address of the first cache set 510, and the sixth cache memory 536 is an embodiment in which the CPU 322 has changed the input address to the fourth word, which is the last address of the first cache set 510. However, additionally, the CPU 322 may change the input address to various locations. For example, based on determining that the cache memory 321 is being attacked, the CPU 322 may change the input address of the input to be accessed thereafter to an input address of the determined point in time. Specifically, the CPU 322 may, based on detecting an attack of the cache memory 321 in the third cache memory 533, fix the input address of all inputs to be accessed thereafter to the third word.

That is, the CPU 322 may change the input address considering various cases of the attacker not being able to access the input value with the desired address.

Figure 7:
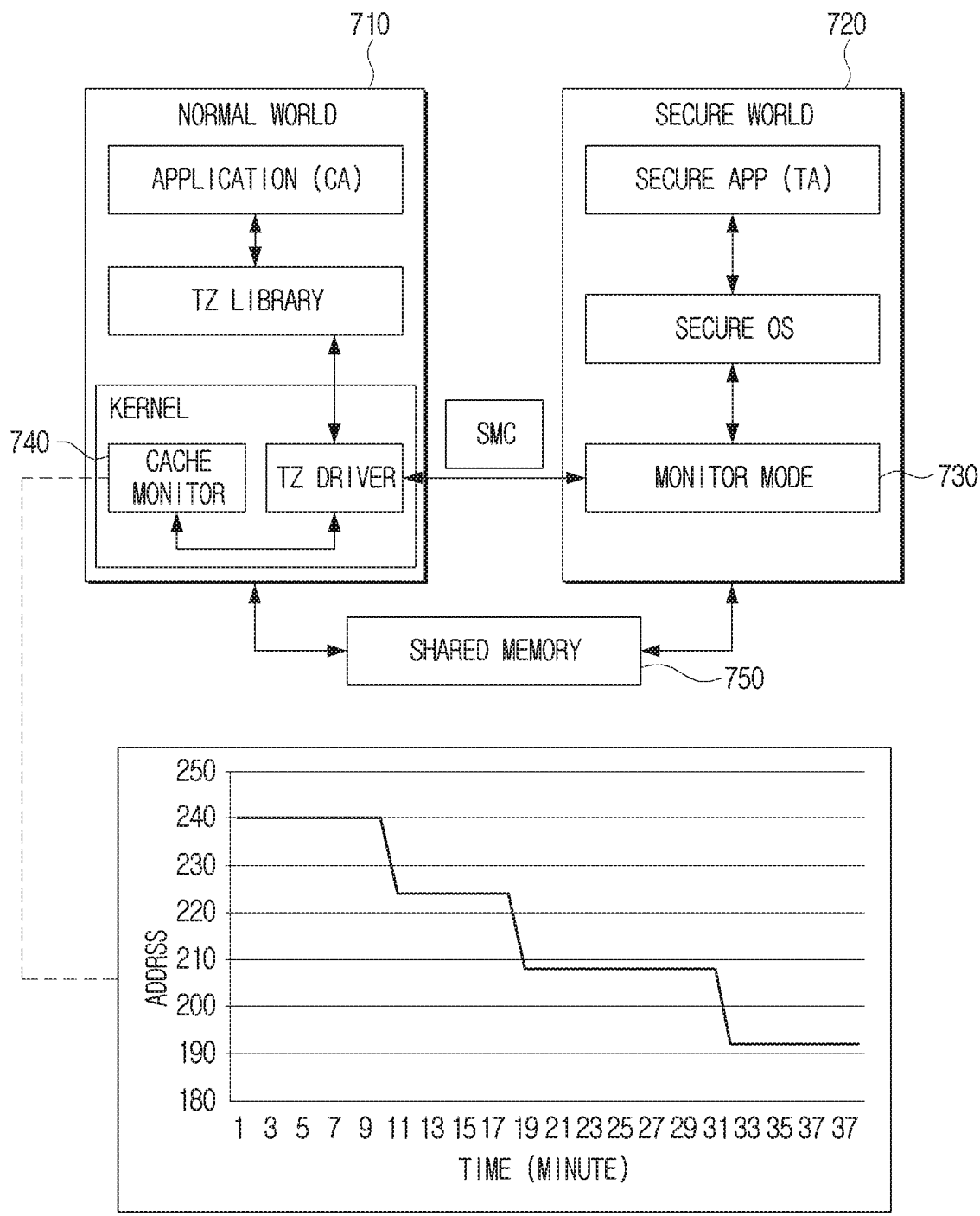
FIG. 7 is an exemplary view for describing an operation of a cache monitor in a TrustZone according to an embodiment of the disclosure.
Figure 8:
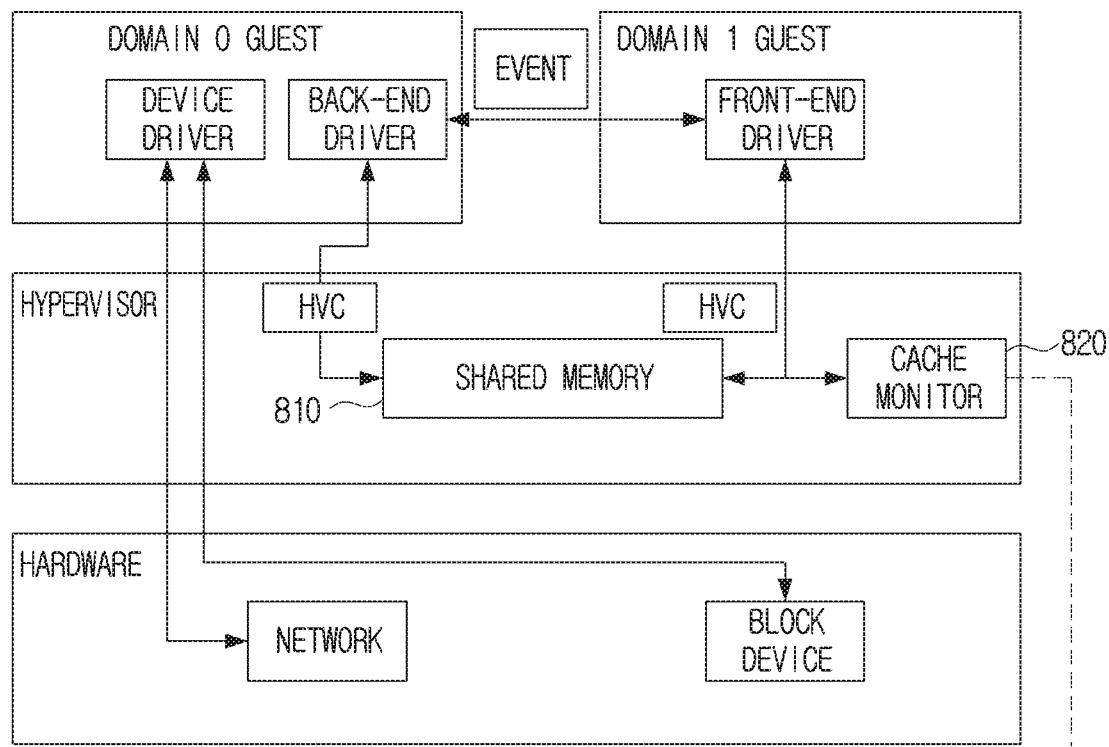
FIG. 8 is an exemplary view for describing an operation of a cache monitor in a virtual machine according to an embodiment of the disclosure.
Figure 8:
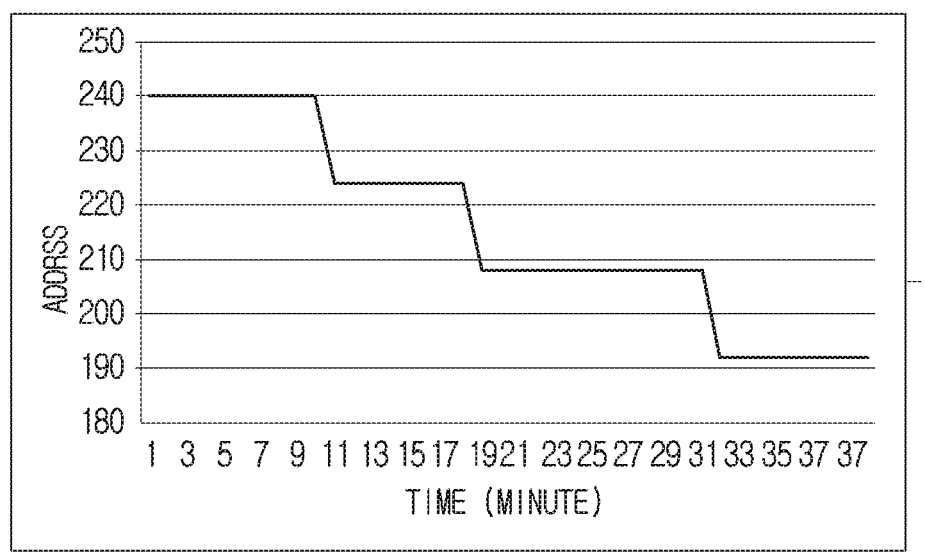

FIGS. 7 and 8 are exemplary views for describing the various embodiments applied with the method of FIGS. 3 to 6.

FIG. 7 is an exemplary view for describing an attack detection method in an environment where one of a normal world and a secure world is selectively operated.

A secure world refers to a data processing architecture with secured security, and a normal world refers to a general data processing architecture.

According to an embodiment, the processor 320 may use "ARM Trustzone Architecture". For an "ARM Trustzone Architecture", a runtime-architected, which is a microprocessor for a system that is divided into two by ARM Holdings, is disclosed. The runtime-architecture such as the above include two types of runtime environment. The first may be a non-secure runtime environment, which may be designated as a "normal zone" or a "normal world". The non-secure runtime environment may be controlled by a normal operating system. The other runtime environment may be a secure runtime environment, which may be designated as a "TrustZone", a "trusted world", or a "secure world". The secure runtime environment may be controlled by a secure operating system.

The normal operating system may be a conventional operating system such as, an android, a windows phone, or a Symbian, and the secure operating system may be an operating system embedded with a security kernel integrated with a security function within an existing operating system such as MOBICORE, RedCastle, or the like. According to ARM TrustZone, the above described non-secure runtime environment and secure runtime environment may be defined as a virtual execution environment.

As described above, a normal world 710 and a secure world 720 may be selectively operated, and thus the TrustZone architecture may provide a monitor mode 730 to manage the change between the normal world 710 and the secure world 720. A software of the monitor mode 730 may be operated in the secure world 720.

Specifically, based on changing from a normal world 710 to a secure world 720 or changing from a secure world 720 to a normal world 710, the monitor mode 730 may store a hardware context of the world currently being executed and restore the context of the new world. For example, based on changing from a normal world 710 to a secure world 720, the execution environment of the normal world 710 may be stored in the monitor mode 7330. Accordingly, based on operating in the secure world 720 and thereafter operating again in the normal world 710, a program may be executed in the environment of the previously stored normal world 710.

As illustrated in FIG. 7, based on the normal world 710 and the secure world 720 being controlled by the monitor mode 730, the various instructions or interrupt generated by the processor 320 may be transferred to each world through the monitor mode. For example, a normal world kernel mode or a secure world kernel mode may be connected using a secure monitor call (SMC) instruction.

That is, the processor 320 may enter the monitor mode 730 using the SMC instruction, and the processor 320 may change the currently executed mode to the monitor mode 730 using the SMC instruction. The present disclosure describes using the SMC instruction in the embodiment, but the disclosure is not limited thereto. That is, in addition to using the SMC instruction, the processor 320 may use an interrupt request (IRQ) or a fast interrupt request (FIQ) to change the mode currently being executed to the monitor mode. Generally an IRQ may be used as an interrupt of the normal world 710 and a FIQ may be used as an interrupt of the secure world 720.

As illustrated in FIG. 7, the kernel mode of the normal world 710 may further include a cache monitor 740. The cache monitor 740 may be configured to monitor changes in the accessed input address. Specifically, the cache monitor 740 may be stored in the memory 310 in the form of a software, and the processor 320 may, if necessary, access the memory 310 loaded with the cache monitor software and perform necessary functions. However, in FIG. 7, the series of operation described above is described as being performed by the cache monitor 740 for convenience of description.

The cache monitor 740 may monitor a shared memory 750 to use for converting the operation of the normal world 710 and the secure world 720. The shared memory 750 may be a cache memory 310.

The processor 320 may control the cache monitor 740 to initialize the cache monitor 740. The processor 320 may set a unit of time required for monitoring, a security hardening policy, and a TA subject to monitoring through a preset policy of the cache monitor 740.

Based on an SMC instruction being occurred, the TZ driver may transfer information on the transmitter and receiver of the SMC instruction to the cache monitor 740. The cache monitor 740 may monitor whether the input address of the shared memory 750 changes to a preset pattern. That is, the cache monitor 740 may monitor a trend of the starting address of the shared memory, which is subject to monitoring, not being cache aligned and changing by a constant rate.

Specifically, the cache monitor 740 may, based on the number of times the SMC instruction is accessed by a specific address of the shared memory 750 being a predetermined number of times or more, monitor the input address for the corresponding SMC instruction.

Based on the input address for the corresponding SMC instruction changing according to the preset pattern, the cache monitor 740 may determine that the SMC instruction has been occurred by an attacker. The preset pattern may refer to change in input address constantly increasing or decreasing for a predetermined time, but is not limited thereto.

Based on the SMC instruction by an attacker determined thereafter being accessed in the shared memory 750, the processor 320 may change the accessed input address. The input address to be changed may be changed according to the above described method.

The processor 320 may, based on the SMC instruction being returned, flush the cache concerning the monitored shared memory 750.

FIG. 8 is an exemplary view for describing an operation of a cache monitor in a virtual machine according to an embodiment of the disclosure.

In general, a virtualization technology is a technology for using a hypervisor software layer to generate a virtual machine in which a plurality of operating systems appear to operate in an actual system hardware. That is, as illustrated in FIG. 8, the hypervisor is located between a hardware and an operating system to prevent the virtual machines from directly connecting to the hardware, and may enhance security by separating the virtual machines from each other.

As illustrated in FIG. 8, the cache monitor 820 may operate on a hypervisor. As described in FIG. 7, the cache monitor 820 may be stored in the memory 310 in the form of a software, and the processor 320 may, if necessary, access the memory 310 loaded with the cache monitor software to perform necessary functions.

Domain 0 and domain 1 may be connected using a hypervisor call (HVC) instruction. Accordingly, the cache monitor 820 may monitor the HVC instruction to detect an attack by an attacker.

Specifically, the processor 320 may control the cache monitor 820 and initialize the cache monitor 820. The processor 320 may set a unit of time required for monitoring, a security hardening policy, and a TA subject to monitoring through a preset policy of the cache monitor 820.

The processor 320 may, based on the HVC instruction being generated, transfer information on the transmitter and receiver of the HVC instruction to the cache monitor 820. The cache monitor 820 may monitor whether the input address of the shared memory 810 changes to a preset pattern. That is, the cache monitor 820 may monitor a trend of the starting address of the shared memory 810, which is subject to monitoring, not being cache aligned and changing by a constant rate.

Specifically, the cache monitor 820 may, based on the number of times the HVC instruction is accessed by a specific address of the shared memory 810 being a predetermined number of times or more, monitor the input address for the corresponding HVC instruction.

Based on the input address for the corresponding HVC instruction changing according to the preset pattern, the cache monitor 820 may determine that the HVC instruction has been generated by an attacker. The preset pattern may refer to change in input address constantly increasing or decreasing for a predetermined time, but is not limited thereto.

Based on the HVC instruction by an attacker determined thereafter being accessed in the shared memory 810, the processor 320 may change the accessed input address. The processor 320 may, based on the HVC instruction being returned, flush the cache concerning the monitored shared memory 810.

Figure 9A:
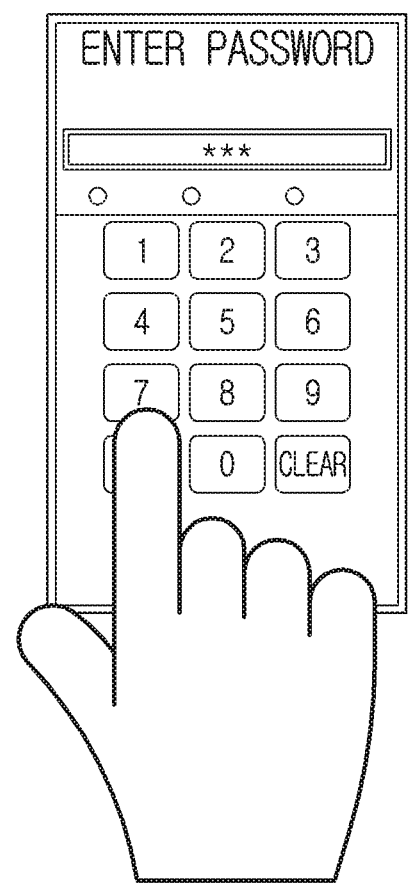
FIGS. 9A and 9B are exemplary views for describing various embodiments to which a security method according to the disclosure may be applied.
Figure 9B:
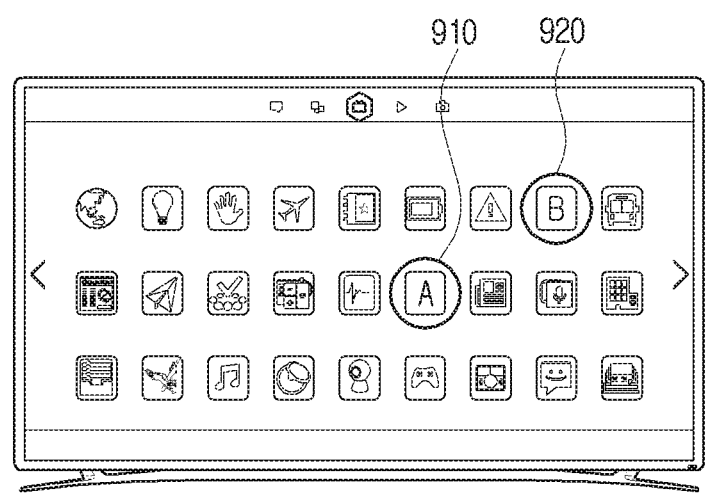

FIGS. 9A and 9B are exemplary views for describing various embodiments to which a security method according to the disclosure may be applied.

As illustrated in FIG. 9A, an attacker may hack a set password of the electronic device 300 through a cache timing attack. Specifically, the attacker may install a malicious application or a malicious code in the electronic device 300 regardless of user intent. The attacker may attempt to learn the password of an approachable program using the application or malicious code installed. That is, the attacker may use the application or malicious code installed to perform the cache timing attack.

The electronic device 300 may, using the cache monitoring method as described above, monitor changes in the address of the input value, and based on the address of the input value changing according to a preset pattern, change the input address to prevent an attack by an attacker.

A same method may be applied with respect to the cache timing attack for hacking the set password of a program such as in FIG. 9A, but also for hacking a cryptographic key. The cryptographic key may refer to a cryptographic key used in an encryption algorithm of various methods. For example, an attacker may hack cryptographic keys of various types such as a symmetric key of an advanced encryption standard (AES) algorithm, or a secret key of an Rivest-Shamir-Adleman (RSA) algorithm though the cache timing attack. That is, the attacker may hack cryptographic keys of various types regardless of the type of encryption algorithm.

In an embodiment as illustrated in FIG. 9B, based on a user downloading encrypted content from a content service application 910 and 920 of the electronic device 300, an attacker may user a pre-installed malicious application or a malicious program to perform the cache timing attack. The attacker may, through the cache timing attack, hack a key for decrypting content stored in a secure zone of the electronic device 300. Accordingly, the electronic device 300 may, using the cache monitoring method as described above, monitor changes in address of the input value and based on the address of the input value changing according to the preset pattern, change the input address to prevent an attack by the attacker.

However, the disclosure is not limited to the embodiment of FIGS. 9A and 9B, the method of the present disclosure may be applied to various embodiments that approach data requiring security. That is, based on an attacker hacking specific data through the cache timing attack, the electronic device 300 may detect and prevent the attack by the attacker through the cache monitor.

FIG. 10 is a flowchart for describing an operation of an electronic device according to an embodiment of the disclosure.

The CPU 322 may access an input value in the cache memory 321 S1010.

The CPU 322 may, based on the input value being accessed in the cache memory 321, monitor the input address through which the input value is accessed S1020. As described above, the CPU 322 may begin monitoring the cache memory 321 according to a specific condition. For example, based on an input value being accessed by the same address by a predetermined number of times or more, the CPU 322 may begin monitoring the cache memory 321 when a cache hit after a cache miss of the predetermined number of times or more is generated.

The CPU 322 may determine whether the input address through which the input value is accessed changes to a preset pattern S1030. The preset pattern may be a pattern in which the input address through which the input value is accessed in the cache memory 321 increases or decreases by a preset address.

Based on the input address through which the input value is accessed not being changed to a preset pattern S1030-N, the CPU 322 may continue to monitor the cache memory 321.

Based on the input address through which the input value is accessed being changed to a preset pattern S1030-Y, the CPU 322 may change input address through which the input value is accessed in the cache memory 321 S1040. The input address to be changed may be determined through various methods. For example, the CPU 322 may change the input address to an initial first word or last word of the cache set including the input address, or to an input address through which the input value is accessed to the point in time the preset pattern is determined.

The devices (example: modules or electronic device 300) or method (example: operations) according to the various embodiments, may be performed by at least one computer (example: processor 320) executing an instruction (or instructions) included in at least one program of programs maintained by, for example, a computer-readable storage media.

Based on the instruction being performed by a computer (example: processor 320), the at least one computer may perform a function corresponding to the instruction. The computer-readable storage medium may be, for example, the memory 310.

The program may be included in a computer-readable storage medium such as a hard disk, a floppy disk, a magnetic media (example: magnetic tape), an optical media (example: compact disc read only memory (CD-ROM)), a digital versatile disc (DVD), a magneto-optical media (example: floptical disk), or a hardware device (example: a read only memory (ROM)), a random access memory (RAM), a flash memory, etc.). The storage medium may generally be included as part of a configuration of the electronic device 300, but may be mounted through a port of the electronic device 300, or may be included in an externally located external device (for example, a cloud server or a different electronic device) of the electronic device 300. In addition, the program may be divided and stored in a plurality of storage media, and at least a part of the plurality of storage media may be located in an external device of the electronic device 300.

The instruction may include not only machine language code as created by a compiler, but also a high level language code executable by a computer using an interpreter or the like. The hardware device described above may be configured to operate as one or more software modules to perform operations of various embodiments, and vice versa.

While the present disclosure has been illustrated and described with reference to various embodiments thereof, the present disclosure is not limited to the specific embodiments described. It will be understood by those skilled in the art that various changes in form and details may be made therein without departing from the spirit and scope of the disclosure.

What is claimed is:

1. An electronic device comprising:
   a memory; and
   a processor comprising a cache memory and a central processing unit (CPU), and configured to control the electronic device using a program stored in the memory,
   wherein the CPU is configured to:
      based on a cache hit being occurred after a cache miss is occurred for a predetermined number of times or more, monitor an input address through which an input value is accessed in the cache memory, and
      based on the input address through which the input value is accessed in the cache memory being changed to a preset pattern, change the input address, and
   wherein the preset pattern comprises an input address through which an input value is accessed in the cache memory being a pattern that increases or decreases by a preset address.

2. The electronic device of claim 1, wherein the CPU is configured to, based on an input value being accessed a predetermined number of times in the cache memory through an input address, monitor the input address through which the input value is accessed in the cache memory.

3. The electronic device of claim 1, wherein the CPU is configured to:
   determine whether an input value accessed by a specific input address in the cache memory is the cache hit or the cache miss.

4. The electronic device of claim 1, wherein the CPU is configured to:
   selectively operate with one of a normal world operating in a normal operating system (OS) and a secure world operating in a secure OS; and
   monitor an input address through which an input value is accessed in the cache memory while operating in the normal world.

5. The electronic device of claim 1, wherein the CPU is configured to:
   operate in a hypervisor mode that controls a plurality of virtual operating systems; and
   monitor an input address through which an input value is accessed in the cache memory in the hypervisor mode.

6. The electronic device of claim 1, wherein the cache memory comprises a plurality of cache sets comprising a plurality of words, and
   the CPU is configured to:
      based on an input address through which an input value is accessed being changed to a preset pattern in one word from the plurality of words, change the input address through which the input value is accessed to an input address of an initial starting word of a cache set comprising the word.

7. A control method of an electronic device comprising:
   based on an input value being accessed in a cache memory and a cache hit being occurred after a cache miss is occurred for a predetermined number of times or more, monitoring an input address through which the input value is accessed; and
   based on an input address through which the input value is accessed being changed to a preset pattern, changing the input address,
   wherein the preset pattern comprises an input address through which an input value is accessed in the cache memory being a pattern that increases or decreases by a preset address.

8. The method of claim 7, wherein the monitoring comprises, based on an input value being accessed a predetermined number of times in the cache memory through an input address, monitoring the input address through which the input value is accessed.

9. The method of claim 7, wherein the monitoring further comprises:
   determining whether an input value accessed by a specific input address in the cache memory is the cache hit or the cache miss.

10. The method of claim 7, wherein the monitoring further comprises:
    selectively operating with one of a normal world operating in a normal operating system (OS) and a secure world operating in a secure OS; and
    monitoring an input address through which an input value is accessed in the cache memory while operating in the normal world.

11. The method of claim 7, wherein the monitoring further comprises:
    operating in a hypervisor mode that controls a plurality of virtual operating systems; and
    monitoring an input address through which an input value is accessed in the cache memory in the hypervisor mode.

12. The method of claim 7,
    wherein the cache memory comprises a plurality of cache sets comprising a plurality of words, and
    wherein the changing comprises:
       based on an input address through which an input value is accessed being changed to a preset pattern in one word from the plurality of words, changing the input address through which the input value is accessed to an input address of a first word of a cache set comprising the word.

13. A non-transitory computer readable recording medium comprising a program for executing a control method of an electronic device, wherein the control method of the electronic device comprises:
    based on an input value being accessed in a cache memory and a cache hit being occurred after a cache miss is occurred for a predetermined number of times or more, monitoring an input address through which the input value is being accessed; and based on the input address through which the input value is accessed being changed to a preset pattern, changing the input address, wherein the preset pattern comprises an input address through which an input value is accessed in the cache memory being a pattern that increases or decreases by a preset address.

\* \* \* \* \*